United States Patent
Pape

(10) Patent No.: US 8,573,877 B2
(45) Date of Patent: Nov. 5, 2013

(54) BALL PIN AND BALL JOINT

(75) Inventor: Klaus Pape, Damme (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/523,061

(22) Filed: Jun. 14, 2012

(65) Prior Publication Data

US 2013/0071174 A1    Mar. 21, 2013

(30) Foreign Application Priority Data

Sep. 19, 2011  (DE) .......................... 10 2011 082 921

(51) Int. Cl.
*F16C 11/06* (2006.01)

(52) U.S. Cl.
USPC ........................................................ 403/122

(58) Field of Classification Search
USPC ............... 403/52, 57, 76, 77, 90, 114, 115, 403/122–144
See application file for complete search history.

(56) References Cited

U.S. PATENT DOCUMENTS

| | | | | |
|---|---|---|---|---|
| 4,035,200 A | * | 7/1977 | Valentijn | 148/283 |
| 4,144,626 A | * | 3/1979 | McEowen | 29/898.051 |
| 4,881,983 A | * | 11/1989 | Smith et al. | 148/217 |
| 5,299,394 A | * | 4/1994 | Surdacki | 451/50 |
| 5,679,411 A | * | 10/1997 | Hoppe | 427/528 |
| 6,113,303 A | * | 9/2000 | Buhl et al. | 403/282 |
| 2008/0145141 A1 | * | 6/2008 | Broeker et al. | 403/39 |
| 2009/0003927 A1 | * | 1/2009 | Howes et al. | 403/131 |
| 2010/0243109 A1 | * | 9/2010 | Baudis | 148/242 |
| 2013/0071174 A1 | * | 3/2013 | Pape | 403/122 |
| 2013/0071175 A1 | * | 3/2013 | Adamczyk et al. | 403/122 |

FOREIGN PATENT DOCUMENTS

| | | |
|---|---|---|
| DE | 203 20 846 U1 | 4/2005 |
| DE | 10 2006 043 067 A1 | 3/2007 |
| DE | 10 2007 060 085 A1 | 6/2009 |
| DE | 10 2008 012 762 A1 | 9/2009 |
| DE | 10 2008 040 689 A1 | 2/2010 |
| DE | 10 2009 016 079 A1 | 10/2010 |
| WO | 2009/109303 A1 | 9/2009 |
| WO | 2010/112611 A1 | 10/2010 |

OTHER PUBLICATIONS

German Search Report from the corresponding German application.

* cited by examiner

*Primary Examiner* — Joshua Kennedy
(74) *Attorney, Agent, or Firm* — Davis & Bujold, PLLC; Michael J. Bujold

(57) ABSTRACT

A ball joint with a ball pin and a steel ball pin with a joint ball. The ball joint and ball pin are suitable for use when solid-on-solid friction predominates, for example under high static pre-loading or under high operational loads and with small joint movements. At least in a bearing contact area, between the joint ball and the bearing shell, does not include any nitrided layer. The surface of the ball pin has an oxide layer, provided as wear protection, at least in the bearing contact area of the joint ball. The oxide layer in the ball joints, previously regarded (as part of the nitriding treatment) as only improving corrosion protection functions as a form of wear protection. Thus, the mutual exclusion between increasing the fatigue strength (by surface layer hardening) and improving the wear resistance (by nitriding/oxidation) is overcome with such ball pins.

17 Claims, 1 Drawing Sheet

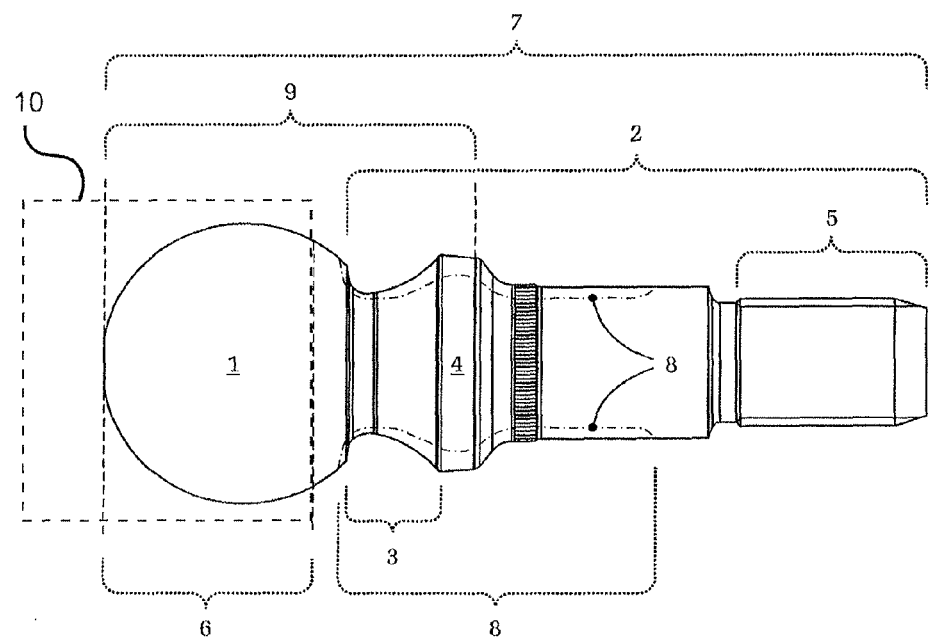

BALL PIN AND BALL JOINT

This application claims priority from German patent application serial no. 10 2011 082 921.0 filed Sep. 19, 2011.

FIELD OF THE INVENTION

The invention concerns a ball pin made of steel and a ball joint.

BACKGROUND OF THE INVENTION

In the case of load-bearing joints subjected to static loading, for example in the chassis area of a motor vehicle, in certain situations (such as periods of rest in combination with only minimal joint movements, or freeway driving) the tribological system of the joint is particularly severely loaded, and in some circumstances this can result in premature wear or failure of the joint. This is related to the fact that in these situations lubricant present in the ball joint is partially expressed out of the contact area between the ball pin and the bearing shell due to the high load in combination with at most small movements of the joint. Because of this the mixed friction, that always exists in a ball joint, namely between fluid friction and solid-on-solid friction, is displaced more markedly toward solid-on-solid friction, with corresponding disadvantageous consequences for the wear of the joint. Another problem known to affect ball joints is corrosion, particularly in the area of the ball pin sealed by sealing bellows, and—if moisture penetrates into the ball joint—also in the bearing gap between the joint ball and the ball socket. This too increases the wear of the joint and can result in the onset of joint play and in the ultimately failure of the joint.

From the prior art, corrosion-protected ball pins and also ball pins with surfaces protected against wear or ball pins with greater fatigue strength are known. According to the prior art enhanced fatigue strength and wear resistance are primarily achieved by improving the material properties by heat treatment or by hardening of the surface layer, in the latter case particularly on the surface of the ball pin.

A known measure against corrosion in the sealing bellows sealed area or in the contact zone between the joint ball and the ball socket consists in the use of nitrided and then oxidized ball pins. According to existing knowledge nitriding of the ball pin serves directly to enhance corrosion protection, while the subsequent oxidation seals the pores produced during nitriding, which increases the corrosion resistance still more. Thus, according to existing knowledge the oxidation subsequent to nitriding serves only to improve the corrosion properties of an otherwise bare steel ball pin.

In the treatments known from the prior art nitriding and surface layer hardening are mutually exclusive, since either the surface hardening is impaired due to the high process temperatures required for nitriding, or conversely, prior nitriding and hence the corrosion protection are destroyed again by a surface layer hardening process. The problem is that in relation to high fatigue strength or load-bearing and wear resistance as well, the desired surface layer hardening of the ball pin should typically take place in the same surface areas of the pin which should also be protected by the nitriding treatment, namely primarily in the area of the joint ball and if necessary in the sealing bellows sealed area of the ball pin.

In summary therefore, the problem is that on the one hand the nitriding of the ball pin desired with a view to corrosion protection, and on the other hand the surface layer hardening desired with a view to long life and good wear resistance, have until now been mutually exclusive for a ball pin—at any rate so far as was known from the prior art.

SUMMARY OF THE INVENTION

Against that background the purpose of the present invention is to provide a ball pin and a ball joint which has a high fatigue strength, good resistance to wear and thus long life, in particular under operating conditions with static pre-loading and micro-movements, or under high operating loads. Reduced corrosion protection in some areas of the ball pin, for example in the sealed area, is acceptable in favor of wear protection or compensated by other technical means such as an additional, corrosion-protected slide-ring. In particular, however, the previous mutual exclusion between surface layer hardening on the one hand and nitriding/oxidation on the other hand, that exists in the prior art, should be overcome so as, really for the first time, to achieve improved wear protection even with pins having a hardened surface layer.

The ball pin, made of steel, has no nitrided layer at least in the bearing contact area between the joint ball and the bearing shell, and is intended for use under high static pre-loading and/or micro-movement conditions and high operational loads, i.e. when joint movements are small or absent and when solid-on-solid friction predominates in the joint gap, at least at times.

With ball pins and ball joints it was discovered by the Inventor that an oxide layer is present on the surface of the ball pin at least in the bearing contact area of the joint ball, and that this oxide layer provides wear protection for the ball pin and the ball joint.

The background of the invention consists in the applicant's realization that a bearing contact area of a joint ball having only an oxide layer and therefore—otherwise than is generally usual and demanded in the prior art—having no nitrided layer, not only provides advantageous corrosion protection properties but, in addition, also results in substantially improved wear behavior of the ball joint. This is particularly true when a ball joint is used under the earlier-described conditions of predominantly solid-on-solid friction, i.e. for example during prolonged periods of rest under static loading or in operating periods during which the joint mainly undergoes micro-movements.

In other words this means that thanks to the applicant's insight, the nitriding, in particular of the joint ball (in order to improve the wear behavior of the bearing) can be dispensed with, since the oxidation of that surface area, in and of itself, already improves the wear behavior of the ball joint in the desired positive manner.

Thus, thanks to the invention, ball pins can be provided with the desired suitability for wear-resistant use, especially when solid-on-solid friction predominates (under high static loading or during operation with micro-movements of the joint), without having to carry out elaborate and costly nitriding. Thanks to the omission of nitriding—along with the wear protection achieved by oxidation compared with a bare pin—by virtue of the invention the possibility of some surface layer hardening of a wear-protected ball pin is no longer excluded as was essentially the case in the prior art. In other words, thanks to the invention the optimization both of fatigue strength and of wear protection in a ball pin are no longer mutually exclusive.

Accordingly the invention provides wear-resistant ball pins with elementary corrosion protection, in which moreover there is no longer mutual exclusion between wear protection and some surface layer hardening.

In a preferred embodiment of the invention, not only the area of bearing contact between the joint ball and the bearing shell, but rather, the entire surface of the ball pin has no nitrided layer. Preferably, the entire surface of the ball pin is provided with an oxide layer.

In this way high-grade ball pins with an advantageous combination of characteristics for fulfilling the polygon of requirements that comprises high fatigue strength, high wear resistance and good corrosion resistance can be obtained, which thanks to the complete omission of the nitrided layer or nitriding treatment, can also be produced for substantially lower cost. Since (in contrast to nitriding) oxidation and other surface treatments, in particular surface layer hardening, are not mutually exclusive, the entire ball pin can be oxidized and this—being a simple process—both saves further costs and also protects the entire pin against corrosion.

Against the background of the omitted nitriding, according to a particularly preferred embodiment of the invention the ball pin is additionally characterized by surface layer hardening. In that respect—thanks to the invention and in contrast to the prior art—there is no longer any conflict between the demand for a high surface hardness and fatigue strength (by virtue of surface layer hardening) on the one hand, and high wear resistance and suitability for use in a situation of inadequate lubrication (by virtue of oxidation) on the other hand.

In this way, therefore, the divergent (and in the prior art still mutually exclusive) requirements for a ball pin, both for hardness/fatigue strength and corrosion protection and for wear resistance by virtue of a combination (for wear protection and corrosion protection) and surface layer hardening (for fatigue strength) can be fulfilled at the same time.

In particular, otherwise than in the prior art, it is now possible also to produce surface layer hardened ball pins, thus having particularly good operational durability and fatigue strength, with additional wear protection and therefore with the capacity to be used when solid-on-solid friction is predominant (i.e. under high static loading or with micro-movements), which according to the doctrine of the prior art was impossible because of the mutual exclusion of surface layer hardening and nitriding, and because the ability of oxidation to provide wear protection had not been recognized.

At the same time the production costs of a wear-protected, high-strength ball pin of such type can be reduced thanks to the omission of the nitriding process (which would entail elaborate process control and a comparatively long process time), while the oxidation process takes up a substantially shorter process time and can therefore be carried out for considerably less cost.

The surface layer hardening can extend over the whole of the ball pin. However, in a further preferred embodiment of the invention the surface layer hardening of the ball pin extends over only part of its surface, preferably over a neck area, a sealing area and at least partially over a shaft area of the ball pin.

In this way therefore, it is particularly those areas of the ball pin where surface hardness and fatigue strength are of paramount importance which undergo surface layer hardening. This applies for example to the particularly severely loaded (with alternating bending) neck area of the ball pin and parts of the ball shaft.

In further preferred embodiments of the invention the ball pin can in addition be polished and/or tempered, even at least in some areas. The polishing process can optionally be carried out before, but also after any surface layer hardening, the latter option especially if the requirements relating to dimensional precision, surface quality and/or strength in surface layer hardened areas are particularly strict. In such a case the polished area can include in particular the entire joint ball as well as the neck area and the seal area of the ball pin.

BRIEF DESCRIPTION OF THE DRAWINGS

Below, the invention is explained in more detail with reference to a drawing which shows only one example embodiment. The sole FIGURE shows a ball pin according to the present invention, viewed from the side.

DETAILED DESCRIPTION OF THE PREFERRED EMBODIMENTS

The FIGURE shows the ball pin, which comprises a joint ball 1, a shaft area 2, a neck area 3, a seal area 4 (against which a sealing bellows rests) and a threaded area 5.

In this case the example embodiment of a ball pin has an oxide layer over its entire length or surface 7. On the one hand the oxide layer leads to an improvement of the corrosion protection, while on the other hand—in accordance with the applicant's new insight—in particular it improves the wear resistance in the bearing contact area 6 between the joint ball 1 and the ball socket 10, only partially diagrammatically shown, of the ball joint. Thus, the ball pin shown is particularly suitable for use under high static pre-loading and/or during periods of operation with micro-movements, in which solid-on-solid friction between the ball pin and the ball socket predominates.

In this case the ball pin shown is additionally provided with surface layer hardening in the area 8 (also indicated with dot-dash lines). This is the area in which the highest mechanical loads occur, to which extra care is therefore devoted by virtue of the surface layer hardening 8 aimed at increasing the fatigue strength of the ball pin.

Finally, the embodiment of the ball pin shown also has a polished area 9. By virtue of the polishing of the ball pin in the area 9, both the corrosion resistance and also the wear resistance and fatigue strength are increased still more.

Thus, thanks to the invention the ball pin can be provided, in its sections or surface areas that are subject to specific requirements, with the respectively necessary properties without the consequent creation of any functional conflicts or (as in the prior art) mutual exclusions as regards their surface treatment or the achievement of the requirements profile desired.

INDEXES

1 Joint ball
2 Shaft area
3 Neck area
4 Seal area
5 Threaded area
6 Bearing contact area
7 Oxidized area
8 Hardened zone
9 Polished area

The invention claimed is:
1. A ball joint comprising:
a bearing shell (10),
a steel ball pin having a joint ball (1) for forming the ball joint with the bearing shell, for use under either high static pre-loading or high operating loads,
a surface of the ball pin, at least in a bearing contact area (6) between the joint ball and the bearing shell, being free of any nitrided layer, and the surface of the ball pin, at least in the bearing contact area (6) of the joint ball (1), comprising an oxide layer provided as wear protection wherein the oxide layer is the only hardening layer in the bearing contact area on the surface of the joint ball.

2. The ball joint according to claim 1, wherein an entire surface (3) of the ball pin is free of a nitrided layer.

3. The ball joint according to claim 1, wherein an entire surface (7) of the ball pin has an oxide layer.

4. The ball joint according to claim 1, wherein at least a portion of the ball pin has surface layer hardening (8) for increasing a fatigue strength of the ball pin.

5. The ball joint according to claim 4, wherein the surface layer hardening (8) of the ball pin extends over only a portion of the surface of the ball pin.

6. The ball joint according to claim 4, wherein the surface layer hardened area (8) of the ball pin extends over a neck area (3), a seal area (4) and at least partially over a shaft area (2) of the ball pin.

7. The ball joint according to claim 1, wherein at least one area (9) of the surface of the ball pin is polished.

8. The ball joint according to claim 1, wherein at least one area of the ball pin is tempered.

9. A ball joint for use under high static pre-loading, with a bearing shell and a steel ball pin with a joint ball (1),
a surface of the ball pin, at least in a bearing contact area (6) between the joint ball (1) and the bearing shell, being free of a nitrided layer, and
the surface of the ball pin having, at least in the bearing contact area (6) of the joint ball (1), comprising an exterior oxide layer in direct contact with the steel material comprising the ball pin which forms a wear protection layer for the ball pin.

10. The ball joint according to claim 9, wherein an entire surface (7) of the ball pin is free of a nitrided layer.

11. The ball joint according to claim 9, wherein an entire surface (7) of the ball pin has an oxide layer.

12. The ball joint according to claim 9, wherein at least a portion of the ball pin has surface layer hardening (8) for increasing a fatigue strength of the ball joint.

13. The ball joint according to claim 12, wherein the surface layer hardening (8) of the ball pin extends over only a portion of the surface of the ball pin.

14. The ball joint according to claim 12, wherein the surface layer hardened area (8) of the ball pin extends over a neck area (3), a seal area (4) and at least partially over a shaft area (2) of the ball pin.

15. The ball joint according to claim 9, wherein at least one area (9) of the surface of the ball pin is polished.

16. The ball joint according to claim 9, wherein at least one area of the ball pin is tempered.

17. A ball joint comprising:
a steel ball pin comprising a shaft area extending therefrom,
the shaft area comprising at least a threaded area, a neck area that abuts the ball pin on one side, and a seal area for abutting an opposite side of the neck area,
an entire outer surface of the ball pin is free of a nitrided layer,
the surface of the ball pin, at least in the bearing contact area (6) of the joint ball or the ball joint, being provided with an oxide layer provided as wear protection wherein the oxide layer is the only hardening layer in the bearing contact area on the surface of the joint ball;
the outer surface of the ball pin at least along the neck area and the seal area of the ball pin is polished, and
the outer surface of the shaft area including at least the neck area and the seal area comprises a hardened surface for increasing a fatigue strength thereof.

* * * * *